United States Patent
Osborne

(10) Patent No.: US 10,733,124 B2
(45) Date of Patent: Aug. 4, 2020

(54) SECONDARY BUS COMMUNICATION BETWEEN DEVICES IN AN AUTOMATED TRANSACTION MACHINE

(71) Applicant: Crane Payment Innovations, Inc., Malvern, PA (US)

(72) Inventor: William Martin Osborne, West Chester, PA (US)

(73) Assignee: Crane Payment Innovations, Inc., Malvern, PA (US)

(*) Notice: Subject to any disclaimer, the term of this patent is extended or adjusted under 35 U.S.C. 154(b) by 157 days.

(21) Appl. No.: 16/068,886

(22) PCT Filed: Jan. 9, 2017

(86) PCT No.: PCT/US2017/012774
§ 371 (c)(1),
(2) Date: Jul. 9, 2018

(87) PCT Pub. No.: WO2017/120607
PCT Pub. Date: Jul. 13, 2017

(65) Prior Publication Data
US 2019/0026242 A1  Jan. 24, 2019

Related U.S. Application Data

(60) Provisional application No. 62/276,748, filed on Jan. 8, 2016.

(51) Int. Cl.
*G06F 13/38* (2006.01)
*G06F 13/40* (2006.01)
(Continued)

(52) U.S. Cl.
CPC .......... *G06F 13/38* (2013.01); *G06F 13/4004* (2013.01); *G06Q 20/1085* (2013.01);
(Continued)

(58) Field of Classification Search
CPC ...... G06F 13/38; G06F 13/4004; G07F 19/20; G07F 11/00; G07F 9/00; G07F 19/209; G06Q 20/1085
See application file for complete search history.

(56) References Cited

U.S. PATENT DOCUMENTS

| 4,766,548 A | 8/1988 | Cedrone et al. |
| 6,119,053 A | 9/2000 | Taylor et al. |

(Continued)

FOREIGN PATENT DOCUMENTS

| DE | 102007044816 B3 | 4/2009 |
| WO | 2015186141 A1 | 12/2015 |

OTHER PUBLICATIONS

European Patent Office, "Supplementary European Search Report," Application No. EP17736534.3, dated Jul. 3, 2019, 4 pages.

(Continued)

*Primary Examiner* — Sonji N Johnson

(57) ABSTRACT

An embodiment of this disclosure provides an apparatus for use in an automated transaction system. The apparatus includes a first interface coupled to a primary bus, the first interface configured to permit communication of data. The apparatus also includes a second interface coupled to a secondary bus, the second interface configured to permit communication of the data. A network topology of the primary bus is different from a network topology of the secondary bus. The apparatus also includes at least one processing device coupled to the first interface and second interface. The at least one processor is configured to communicate the data over at least one of the first interface or second interface.

13 Claims, 7 Drawing Sheets

(51) Int. Cl.
*G07F 19/00* (2006.01)
*G07F 11/00* (2006.01)
*G07F 9/00* (2006.01)
*G06Q 20/10* (2012.01)

(52) U.S. Cl.
CPC ............... *G07F 9/00* (2013.01); *G07F 11/00* (2013.01); *G07F 19/20* (2013.01); *G07F 19/209* (2013.01)

(56) References Cited

U.S. PATENT DOCUMENTS

| | | | |
|---|---|---|---|
| 6,146,150 A | 11/2000 | Roberts | |
| 6,311,165 B1 | 10/2001 | Coutts et al. | |
| 6,751,697 B1 | 6/2004 | Shima et al. | |
| 6,910,090 B1 | 6/2005 | Scheel et al. | |
| 7,131,575 B1 | 11/2006 | Kolls | |
| 7,545,816 B1 | 6/2009 | Coutts et al. | |
| 7,912,914 B2 | 3/2011 | Coutts et al. | |
| 10,380,564 B1* | 8/2019 | Wilson | G06Q 20/0855 |
| 2005/0256991 A1 | 11/2005 | Keller | |
| 2006/0169764 A1* | 8/2006 | Ross | G07F 19/20 |
| | | | 235/375 |
| 2009/0327302 A1 | 12/2009 | Richardson et al. | |
| 2012/0005297 A1 | 1/2012 | Robles Gil Daellenbach et al. | |
| 2012/0084578 A1 | 4/2012 | Ghosh et al. | |
| 2013/0254358 A1 | 9/2013 | Phung et al. | |
| 2017/0329777 A1* | 11/2017 | Vlugt | G07B 15/02 |

OTHER PUBLICATIONS

European Patent Office, "Communication pursuant to Article 94(3) EPC," Application No. EP17736534.3, dated Jul. 17, 2019, 5 pages.
International Preliminary Report on Patentability regarding International Application No. PCT/US2017/012774, dated Jul. 10, 2018, 7 pages.

* cited by examiner

SECONDARY BUS COMMUNICATION BETWEEN DEVICES IN AN AUTOMATED TRANSACTION MACHINE

CROSS-REFERENCE TO RELATED APPLICATION(S) AND CLAIM OF PRIORITY

The present application is a § 371 National Stage of Application No. PCT/US2017/012774 filed Jan. 9, 2017. International Patent Application No. PCT/US2017/012774 claims priority under 35 U.S.C. § 365 and/or 35 U.S.C. § 119(e) to U.S. Provisional Patent Application 62/276,748 filed on Jan. 8, 2016, each of which are incorporated herein by reference into the present disclosure as if fully set forth herein.

TECHNICAL FIELD

This disclosure is generally directed to automated transaction systems, automated teller machines, unattended payment machines, and vending machines. More specifically, this disclosure is directed to data communication over a secondary bus between automated transaction systems components and data communication between host machine components.

BACKGROUND

Payment peripherals and automatic transaction machines communicate via standard industry protocols such as multi-drop bus (MDB). Although the industry protocols allow basic functionality, additional information is transferred locally within the machine together with external connections such as audit and service tools. These connections require a technician to physically access the machine and perform updates and other various service requests. Having a technician physically access a machine is expensive and can cause delays.

SUMMARY

This disclosure provides a secondary bus for automated transaction systems and vending machines.

One embodiment provides an apparatus for use in an automated transaction system. The apparatus includes a first interface coupled to a primary bus, the first interface configured to permit communication of data. The apparatus also includes a second interface coupled to a secondary bus, the second interface configured to permit communication of the data. A network topology of the primary bus is different from a network topology of the secondary bus. The apparatus also includes at least one processing device coupled to the first interface or second interface. The at least one processor is configured to communicate the data over at least one of the first interface or second interface.

An embodiment of this disclosure provides an automated transaction system. The system includes a primary bus including a host controller, a first device coupled to the host controller over the primary bus, a second device coupled to the host controller over the primary bus, and a secondary bus coupled to the first device and second device. The first device is configured to directly communicate with the second device over the secondary bus.

An embodiment of this disclosure provides an apparatus for use in an automated transaction system. The apparatus includes a memory element configured to store a device list, at least one processing device configured to: identify one or more devices in a network; add the one or more devices to the device list; and provide the device list to the one or more devices of the network to allow the one or more devices to directly communicate over the network.

An embodiment of this disclosure provides a method for communicating over multiple networks in an automated transaction system. The method includes communicating with a host controller over a primary bus in the automated transaction system. The method also includes identifying one or more devices on a secondary bus in the automated transaction system. The method also includes directly communicating with one of the one or more devices over the secondary bus.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C"

includes any of the following combinations: A, B, C, A and B, A and C, B and C, and A and B and C.

DETAILED DESCRIPTION

FIGS. 1 through 6, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

Definitions for other certain words and phrases are provided throughout this patent document. Those of ordinary skill in the art should understand that in many if not most instances, such definitions apply to prior as well as future uses of such defined words and phrases. This disclosure provides a flexible common secondary bus between devices of an automated transaction system vending machine that can be used in addition to a primary bus.

Figure 1:
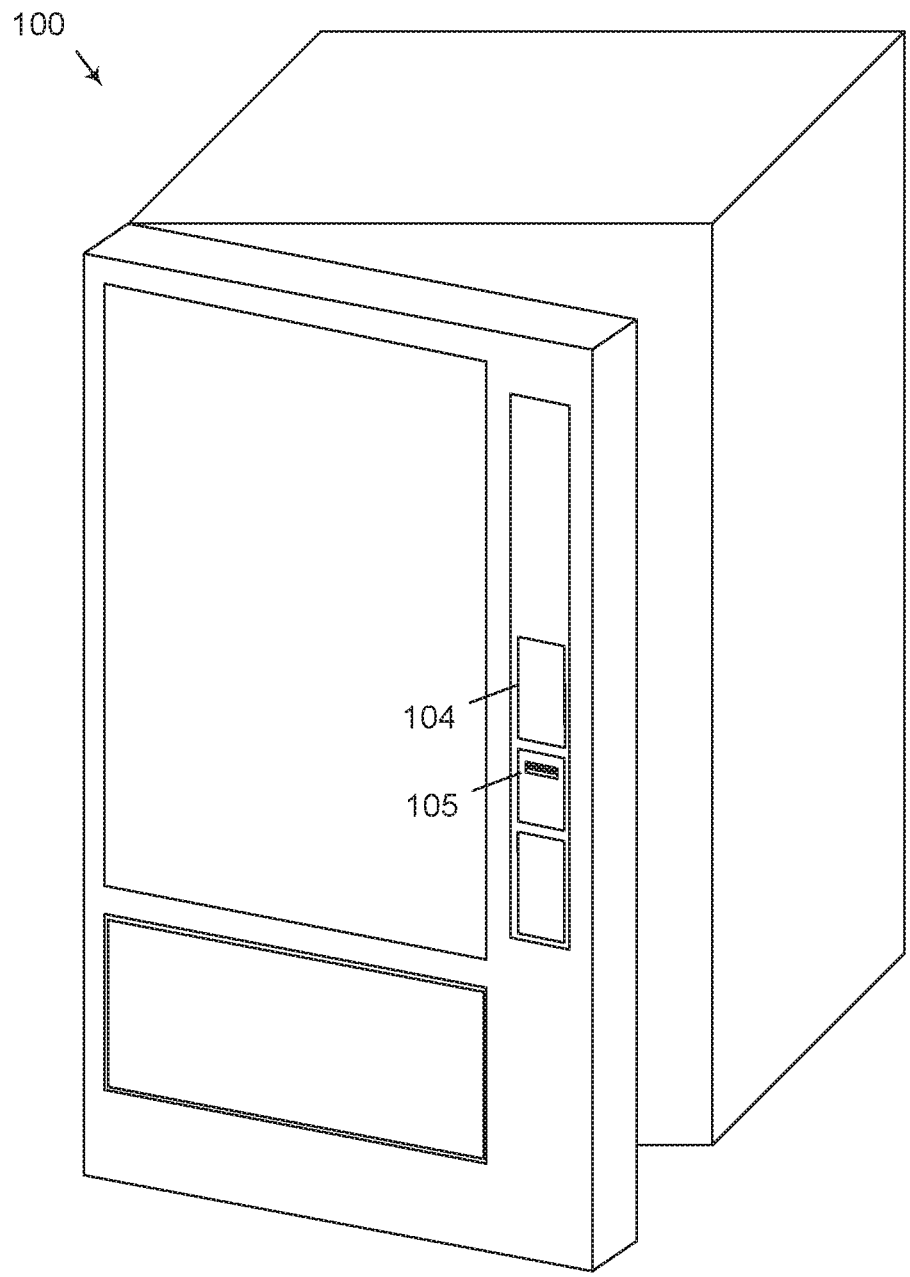
FIG. 1 is a simplified perspective view illustrating a vending machine with an automated transaction system implementing a secondary bus according to one embodiment of the present disclosure.

FIG. 1 is a simplified perspective view illustrating a vending machine 100 with an automated transaction system implementing a secondary bus according to one embodiment of the present disclosure. A vending machine, as illustrated in FIG. 1, is one example of an apparatus that can implement an automated transaction system. Vending machine 100 includes a cabinet and a service door that together define an enclosure.

Automated transaction system includes a customer product selection interface 104 and payment systems 105. Customer product selection interface 104 can be a touch-screen liquid crystal display (LCD) display and input or other type of touch-screen display. Payment systems 105 may include one or more of a coin mechanism, a note validator and/or recycler, a magnetic stripe swipe mechanism for reading the magnetic stripe on credit or debit cards as well as gift cards, near-field communication device for receiving wireless payment, integrated circuit cards (ICCs), smart cards, and the like. In one or more embodiments, some of these devices may be combined into a single device. For example, the note validator or the coin mechanism may also include a near-field communication aspect.

The vending machine 100 includes a delivery bin door positioned below a transparent window and substantially across the width of the product columns behind the transparent window. In different embodiments, the delivery bin door may be positioned alongside the transparent window. In yet other embodiments, the window may not be transparent, but opaque. Products available for vending are thus held in, for example, helical coils on shelves visible from the exterior through the transparent window and are dropped through a space between the shelves and the transparent window into the delivery bin behind delivery bin door.

Those skilled in the art will recognize that the complete structure of a vending machine is not depicted in the drawings, and the complete details of the structure and operation of the vending machine is not described herein. Instead, for simplicity and clarity, only so much of the structure and operation of a vending machine as is unique to the present disclosure or necessary for an understanding of the present invention is depicted and described. In addition, other types of automated transaction systems may include different and other components than those depicted for the vending machine.

Figure 2:
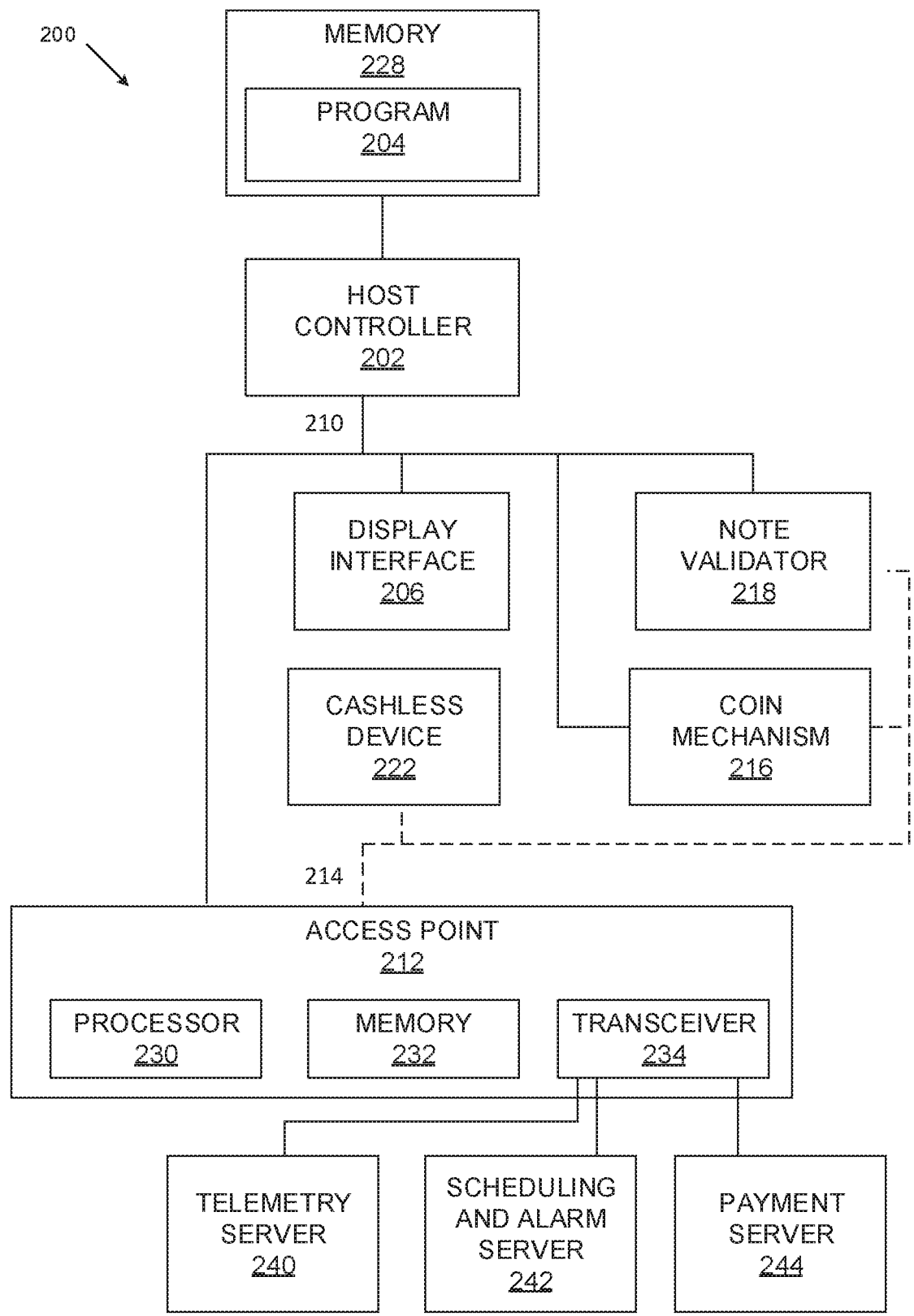
FIG. 2 is a block diagram of the automated transaction system utilizing a secondary bus according to embodiments of the present disclosure.

FIG. 2 is a block diagram of the automated transaction system 200 utilizing a secondary bus according to embodiments of the present disclosure. Although certain details will be provided with reference to the components of the automated transaction system 200, it should be understood that other embodiments may include more, less, or different components. The embodiment of the automated transaction system 200 illustrated in FIG. 2 is for illustration only. FIG. 2 does not limit the scope of this disclosure to any particular implementation of an automated transaction system.

The automated transaction system 200 includes a host controller 202, display interface 206, a primary bus 210, access point 212, secondary bus 214, coin mechanism 216, note validator 218, cashless device 222 (e.g., magnetic swipe card reader and near-field communication device. The coin mechanism 216 is configured to accept and dispense coins and a note validator 218 is configured to accept, validate, and dispense notes. A note can also be referred to as a banknote, treasury note, bill, ticket, cash, money, bank-draft, promissory note, coupon, check (personal, cashier, travelers), currency, bond, drafts and documents of value (paper, metal, polymer), or a combination thereof, and the like. A coin can also be referred to as a token, slug, and object of value (metal, polymer), or a combination thereof, and the like. The coin mechanism 216, note validator 218, cashless device 222 (e.g., magnetic swipe reader and near-field communication device) can be referred to as a payment device. In further embodiments, the payment devices can also include a cashless payment or loyalty reader. In one or more embodiments, note validator 218 could include a recycler. In other embodiments, the recycler could be a separate components of the system.

In one example embodiment, the host controller 202 for a vending machine includes a vending machine controller (VMC), typically implemented using a programmable microcontroller mounted on a printed circuit board (PCB) with suitable connections to the primary bus 210. The primary bus 210 can be a Multi-Drop Bus (MDB) for peripherals. Coupled to host controller 202 is the display interface 206 for controlling operation of a display, such as an array of eight-segment light emitting diode (LED) character displays, a touch screen, or other suitable graphical display. One example of the interface 206 can be interface 104 as shown in FIG. 1. The host controller 202 and display interface 206 cause the display to show a menu incorporating the products offered for sale within the vending machine 100.

The host controller 202 is also coupled to a memory 228 containing a workflow program 204 controlling the process of vend transactions within the vending machine 100. The memory 228 can include any suitable volatile or non-volatile storage and retrieval device(s). For example, the memory 228 can include any electronic, magnetic, electromagnetic, optical, electro-optical, electro-mechanical, or other physical device that can contain, store, communicate, propagate, or transmit information. The memory 228 can store data and instructions for use by the host controller 202. The host controller 202 can also be a processor or multiple processors, including processing circuitry.

The host controller 202 is communicatively linked with the payment devices via the primary bus 210. The primary bus 210 allows for communication between devices of the automated transaction system 200 using a master-slave relationship. The primary bus 210 can utilize protocols such as MDB, Executive Interface (BDB), VCCS, or the like. The host controller 202 acts as the master controller for all other slave devices of the automated transaction system 200 (such as the payment devices, interface 206, or the like). Using the primary bus 210, the host controller 202 acts as a central hub or router to receive data from slave devices and transmitting data to slave devices, for example, based on the received data. In other words, the slave devices do not communicate directly with each other over the primary bus 210. It should be noted that such a primary bus may or may not support a transfer of large files such as data files of above a threshold size. The size of the file may be impractical to transfer over the primary bus 210. The primary bus 210 can provide power as well as basic machine communications to one or more devices of the automated transaction system 200, including the access point 212.

The secondary bus 214 may operate in tandem or independently with the primary bus 210. The secondary bus 214 creates a peer-to-peer (P2P) communication network topology or mesh network topology between the devices of the automated transaction system 200 to share resources that are useful to multiple devices of the automation system. P2P and mesh network topologies may both be referred to as ad-hoc networks. An ad-hoc network is an unplanned network with a self-organizing functionality. For example, the note validator 218 can share a real time clock via the secondary bus 214 with the coin mechanism 216 to help detect fraud. By sharing a real time clock of the coin mechanism 216 via the secondary bus 214 with the note validator 218, the note validator 218 can differentiate a plurality of vends between a time range as fraudulent vends from a plurality of vends between another time range as legitimate vends.

As another example, the coin mechanism 216 or the note validator 218 may not include a display. The coin mechanism 216 or the note validator 218 can share a use of the display interface 206 via the secondary bus 214. In other words, with an implementation of the secondary bus 214, all devices of the automation system 200 can directly share resources with each other. Shared resources can include a shared hardware device (such as an LCD display or a memory), shared data, or the like. It should be understood that the display interface 206 can also be a diagnostics LCD display disposed within a body of the automated transaction system 200 for access by a technician.

In one example embodiment, the secondary bus 214 can be implemented through the use of a controller area network bus (CAN bus). The secondary bus 214 may also permit sharing of memory as well as processing resources between nodes (nodes can refer to any device connected to the secondary bus 214). Any individual node may allow use of idle memory or processing power to assist a node needing memory or processing power for currency validation, graphics display, or other applications. Each of the nodes can be configured to utilize the secondary bus 214 based on at least one of a size of data to be communicated or a type of data to be communicated. For example, a node can include different interfaces to transmit and/or receive data via the secondary bus 214 and primary bus 210. The buses 210 and 214 can utilize different network topologies. For example, bus 210 may use master/slave, while bus 214 uses either P2P or mesh. Different network topologies can indicate a difference in addressing systems. For example, in a first topology, direct addressing between peripheral devices is not possible, while a different topology provides direct addressing between peripherals.

The node can determine, via a controller, to transmit data directly to another node via the secondary bus 214 by activating the interface to the secondary bus 214 and transmitting the data using the interface to the secondary bus 125 based on at least one of a size of the data to be transmitted or a type of the data to be transmitted. In an embodiment, the node can be configured to utilize the secondary bus 214 based on a type of device to receive data communication.

The secondary bus 214 an also be used to distribute power provided by the host controller 202, or other source, to one or more devices of the automation system 200.

In one example embodiment, the secondary bus creates a P2P communication network between devices of an automated transaction system 200 to allow electronic access to devices of the automated transaction system 200 via a single access point (such as access point 212). The secondary bus 214 can be communicatively coupled to the access point 212. The P2P communication network can also allow for direct communication through the access point 212.

In another example embodiment, the secondary bus creates a communication network between devices of an automated transaction system 200 to allow direct communication between the devices as well as electronic access to devices of the automated transaction system 200 via a single access point (such as access point 212).

In one example embodiment, the access point 212 can be a telemeter. The access point 212 can provide access external from the automated transaction system 200 such that an external device (such as a mobile device) can access devices communicatively linked to the secondary bus 214. For example, an external device can access audit files, diagnostic files, and exchange and transmit commands from any device communicatively linked to the secondary bus 214 via the access point 212. The access point 212 can be referred to herein as a gateway or controller. When operating on the secondary bus 214, the access point 212 can be referred to as a secondary controller to distinguish from the host controller 202.

In one example, the access point 212 could be part of one of devices 216-222. In different example embodiments, the access point 212 can be a separate device with physical connections to a primary 210 and secondary 214 bus; the access point 212 could be a device on another peripheral with a physical connection to the secondary bus, and a power and/or connection to a primary bus via the peripheral; the access point 212 could be part of another peripheral and include a shared hardware and datalink layer for connection to the secondary bus 214. In one or more of these example embodiments, the access point 212 and peripherals, whether combined or not, may appear as separate nodes on a primary 210 and/or secondary 214 bus.

As another example, an external device with a display screen can view parameters of multiple devices communicatively linked to the secondary bus 214, store parameters in a memory of one device of the automated transaction system 200 for another device of the automated transaction system 200, use memory on one device of the automated transaction system 200 to upload firmware to another device of the automated transaction system 200, and the like, via the access point 212. The access point 212 can allow an external device to access information at each of the device communicatively linked via the secondary bus 214 via a wired communication channel or via wireless communication (such as ZIGBEE™ or near field communication) using, for example, a long distance communication connection to the Internet by use of a cellular modem, WiFi transceiver, or wired Ethernet connection.

In one or more example embodiments, the use of the primary bus 210 and secondary bus 214 allows for simultaneous access to a device of the automated transaction system 200. During simultaneous access, the processor or controller of the device can concurrently perform or execute one or more processes. For example, the note validator 218 can receive a firmware update through the secondary bus 214 while performing a payment transaction through the primary bus 210.

Some features of the secondary bus 214 can include: (1) support for a plurality of nodes with some node addresses being reserved for broadcast message; (2) other nodes are aware when devices attach or detach from the secondary bus 214 through the use of a device list; (3) messages transferred via the secondary bus 214 can be prioritized such that sustained data transfer is maintained while still allowing fast synchronous messages to be sent from node to node; (4) peripheral to peripheral communications for enhanced functionality; (5) enhanced security; (6) remote access when combined with an access point 212; (7) payload diagnostics allowing the secondary bus 214 to support a plurality of different protocols (such as 256 different protocols) such that there is no restriction on the format or message length; and (8) the secondary bus 214 can be implemented across a range of inexpensive and expensive peripherals.

In some embodiments, the secondary bus 214 can include a maximum node-to-node message latency of about 30 ms. Messages can take less than 16 ms while a background data transfer is occurring and below 10 ms during normal bus activity. The timings of the secondary bus 214 are also capable of sustained transfers of large amounts of data without significantly adversely affecting other bus traffic. For example, a 1 megabyte (MB) file can be transferred in less than 120 seconds. In one example embodiment, the protocol for the secondary bus 214 can be based on an IOS 7 layer model.

In one example embodiment, the host controller 202 may be coupled to the secondary bus 214. In this example, the host controller 202 may provide power to the access point 212.

The access point 212 includes processor 230, memory 232, and transceiver 234. The processor 230 can be any type of processing device and may include multiple processing cores. The processor 230 can include processing circuitry. The memory 232 can include any suitable volatile or non-volatile storage and retrieval device(s). For example, the memory 232 can include any electronic, magnetic, electro-magnetic, optical, electro-optical, electro-mechanical, or other physical device that can contain, store, communicate, propagate, or transmit information. The memory 232 can store data and instructions for use by the access point 212. The transceiver 234 can be configured to communicate wirelessly using ZigBee, Bluetooth, 2G, 3G, 5G, LTE, LTE-A, WiMAX, WiFi, or other wireless communication techniques.

In one or more embodiments, the access point 212 can communicate to a telemetry server 240, scheduling and alarm server 242, and/or payments server 244 through the transceiver 234. Through this communication the access point 212 can allow for remote audit reporting, scheduling, alarm reporting, firmware upgrades, and the like.

Although FIG. 2 illustrates one example of an automated transaction system 200, various changes may be made to FIG. 2. For example, the components of the automated transaction system 200 could be rearranged or have different patterns. Various components in FIG. 2 could be omitted, combined, or further subdivided and additional components could be added according to particular needs. For example, while shown separately, memory 228 may be a part of host controller 202. Additionally, as processor 230 is shown as part of access point 212 with memory 232, the memory 232 may be external to the access point 212. In yet another example, access point 212 may only include some of the components as shown in FIG. 2.

Figure 3:
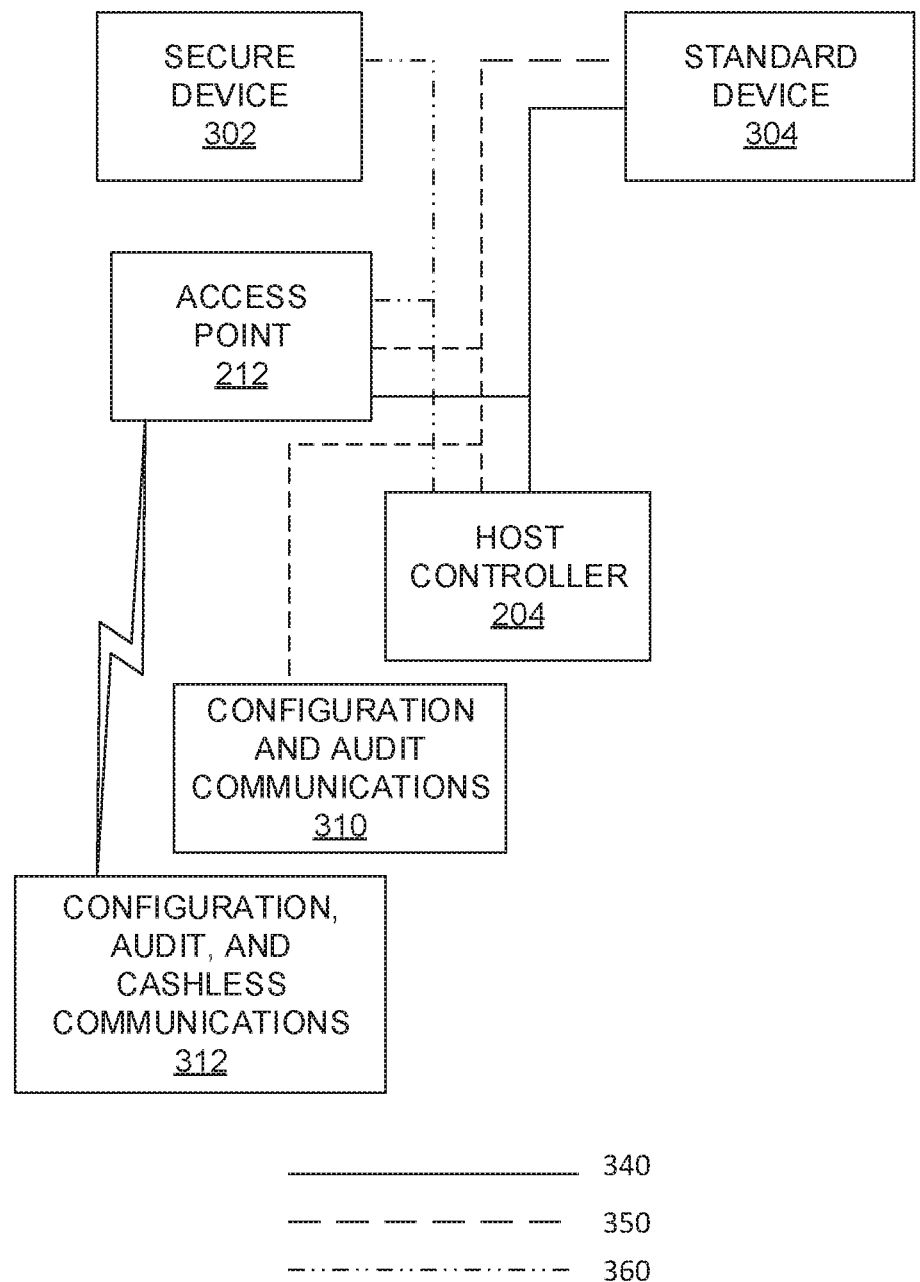
FIG. 3 illustrates a secure communication system according to this disclosure.

FIG. 3 illustrates a secure communication system 300 according to this disclosure. The embodiment of the secure communication system 300 illustrated in FIG. 3 is for illustration only. FIG. 3 does not limit the scope of this disclosure to any particular implementation of a secure communication system. The secure communication system 300 is one example embodiment of automated transaction system 200

As shown in FIG. 3, the secure communication system 300 includes an access point 212, a secure device 302 (such as a cashless device 222), and a standard device 304 (such as a coin mechanism 216 or note validator 218). The communication types are illustrated as machine bus communications 340 over a primary bus, normal communications 350 over a secondary bus, and secure communications 360 over the secondary bus.

The access point 212 (such as a telemeter) contains a secure element to hold encryption and authentication keys for remote access or for device-to-device encryption of selected messages. The access point 212 further contains a secure bootloader with software updates and optional configurations protected by certificates (such as manufacturer or service certificates). The remote access can be for configuration, audit, and cashless communications 312 to a server. Host controller 310 can be configured for wired communications configuration, and audit communications 312 to a server.

The secure device 302 contains a secure element for device-to-device encryption of selected messages. The secure device 302 also contains a secure bootloader with software updates and optional configurations protected by certificates (such as manufacturer certificates). The encryption keys can be stored in a secure access module.

The standard device 304 includes encryption configuration messages and contains a secure bootloader with software updates and optionally configurations protected by certificates (such as manufacturer certificates). The encryption keys can be stored in a processing system.

The protocol is based on the open system interconnection (OSI) 7 layer model. This model defines the following layers: physical layer, datalink layer, network layer, transport layer, session layer, presentation layer, and application layer.

In one example embodiment, the physical layer can be based on the differential RS485 protocol. The physical layer includes electrically that allows a bus with up to 32 nodes with data rates of up to 35 Mbit/s for buses of less than 100 meters. It should be noted that the receivers should be permanently enabled. In one example embodiment, the serial protocol can conform to the following: baud rate of 115,200 bits/s, data bits equal to eight, one start bit, one stop bit, and no parity. A node's transmitter can be disabled until it is desired to send traffic. The transmitter can remain enabled until the last stop bit of the last character in any message has been transmitted.

For datalink and network layers, the datalink is responsible for reliably transmitting data from one node to another. Broadcast messages to all nodes are also supported. The datalink is payload agnostic and can carry a variety of transport and application protocols. The basic default datalink packet size is 1 to 255 data bytes. The protocol may optionally chain several packets together to achieve larger payloads. The protocols can either be custom designed for particular applications and existing protocols such as ccTalk, MDB, Internet protocol (IP) can be supported.

For node identifications (IDs), it should be understood that each node on a secondary bus can have a unique node ID from 0x01 (1D) to 0x1F (31D). Any type of node can use any free address. The 0x00 (0D) node ID can be reserved for broadcast messages.

For message prioritization, to allow different message types to co-exist on the bus, traffic is split into three categories: datalink control messages (ACK, NAK, and BUSY), normal messages, and data transfer. Datalink messages can have the highest priority and data transfer messages the lowest priority. Within each group, all messages may initially have the same priority. Should a collision occur, the transmitting nodes could assign a random delay to the colliding messages to ensure they do not retry at the same time. This prioritization allows large amounts of data to be transferred in the background while remaining responsive to normal inter node traffic. The random priority within a group means that every node, over time, has an equal chance of accessing the bus.

For timeouts, the following timeouts will be referred to throughout the following sections:

Inter-character timeout is the max time between characters in a message. This is defined to be five characters or fifty bits. At 155,200 baud, this time can be about 500 microseconds.

Datalink ACK time is the max time for the datalink to wait for an acknowledge response from the destination node. This time can be 10 milliseconds (ms).

To allow message prioritization, the following initial bus access delays could be used:

ACK/NAK/RET—Datalink acknowledges can access the bus immediately after a preceding message.

Standard Message—Standard messages can access the bus a minimum of 500 microseconds after a proceeding message.

Data Transfer—Data transfer messages can access the bus after a minimum of 1000 microseconds after a preceding message.

In one example embodiment, these are the minimum allowed access times. Nodes may extend these times if required. To maintain message prioritization after a bus collision, the sum of the initial bus access times plus a random time of 0-500 mS could be used.

For Bus Access Retry, after a collision, the node could wait for at least the inter character time before attempting to access the bus again. To minimize further collisions between two or more nodes trying to access the bus, the retry delay time is the base message delay plus a random time of between 0 and 465 uS as follows:

TABLE 1

| Message Type | I/C Delay | Base Delay | Variable Delay | Total Delay |
|---|---|---|---|---|
| Control | 500 uS | 0 uS | 0-465 uS | 500-965 uS |
| Normal | 500 uS | 500 uS | 0-465 uS | 1000-1465 uS |
| Data Transfer | 500 uS | 1000 uS | 0-465 uS | 1500-1965 uS |

For pseudo 4-bit random number generator, while any algorithm can be used to generate the random or pseudo random delay, the cyclic redundancy code (CRC) 16 calculator already implemented for message protection can also be used. The CRC should be initialized to 0xFFFF and the current node id added to the CRC. The lower four bits of the new CRC will be the pseudo random delay.

CRC=0xFFFF; //Only required at startup
CRC=CalcCRC(CRC, Node Id);
Delay (uS)=(CRC & 0xF)*15;

The above algorithm will restrict the "random" times to values between 0-500 uS. The algorithm can be modified for systems without the resources to implement a timer with the required 15 uS resolution by adjusting the 15 uS multiplier and using less bits of the CRC.

For packet format, the datalink layer of the protocol performs the low level data transfer between nodes. It will allow reliable transfer of up to 255 bytes of data. The transport layer can support larger data transfers by using multiple datalink messages. Total Max Packet Size—262 bytes. Bus throughput will be 39 full messages a second at 115 kilobaud (Kbaud). The packet format is shown in Table 2.

TABLE 2

| Byte | |
|---|---|
| 0 | Source address (first byte so guaranteed collision if 2 nodes transmit stimultaneously) |
| 1 | Destination address |
| 2 | Control byte |
| 3 | Length |
| 4 – n | 0 to 255 data bytes |
| n + 1 | CRC MSB |
| n + 2 | CRC LSB |

Table 3 can show examples of the control byte.

TABLE 3

| Bit 7 | 6 | 5 | 4 | 3 | 2 | 1 | Bit 0 |
|---|---|---|---|---|---|---|---|
| WAN Access | RFU | RFU | RFU | MsgNum | Packet Type Bit 2 | Packet Type Bit 1 | Packet Type Bit 0 |

For a packet type, a three-bit field defines the type of packet being sent. Table 4 shows the different packet types and fields.

TABLE 4

| Packet Type Bit 2 | Packet Type Bit 1 | Packet Type Bit 0 | Packet Type |
|---|---|---|---|
| 0 | 0 | 0 | DATA |
| 0 | 0 | 1 | ACK |
| 0 | 1 | 0 | NAK |
| 0 | 1 | 1 | BUSY |
| 1 | 0 | 0 | Join Network Request |
| 1 | 0 | 1 | Join Network Confirm |
| 1 | 1 | 0 | Leave Network |
| 1 | 1 | 1 | RFU |

In Table 4, the data messages can normally contain additional message bytes. The NAK message can have an additional byte containing a NAK reason. The Join Network Confirm message can have additional data bytes reporting the product type. The BUSY message can have an additional byte containing a retry delay.

The message number is a single bit field that indicates the number of the current message. Only two message numbers are required to assist with handling protocol exceptions. A message number should be maintained per node and the first message between two nodes should be set to Message 0.

TABLE 5

| MsgNum | Packet Type |
|---|---|
| 0 | Message 0 |
| 1 | Message 1 |

The Wide Area Network (WAN) access field is a single bit that indicates whether or not the message has arrived over the WAN. Nodes may choose to use this bit to restrict access for sensitive messages, if required.

TABLE 6

| WAN Access | Message Source |
|---|---|
| 0 | Local Area Network |
| 1 | Wide Area Network |

To protect the transaction, a CRC can be appended to the end of the message. The CRC polynominial can be $X^{16}+X^{15}+X^2+1$.

For bus access, nodes can attempt to access the bus after there has been no bus activity for a predefined amount of time. The time depends on the type of traffic being sent. Nodes can continuously monitor the bus so that potentially the bus delay timeouts have expired when a message needs to be sent, allowing messages to be sent immediately. If it is not possible to continually monitor the bus, the bus access timeout must be started when the node wishes to send a message.

For collision detection, occasionally two nodes will attempt to access the bus simultaneously. To detect this, the senders' receiver should be enabled for at least the first byte transmitted. This byte is the senders' node id and therefore will be unique. If the local loopback shows the first byte received is not the correct node id, transmission should be aborted and a retry exception started. Note that due to the open collector bus and depending on the exact node ids, one of the ids may not get corrupted. In this case, all receiving nodes have received the same source id and the message can be continued. For non-transmitting nodes on the bus, collisions will not be immediately obvious. A valid character could be received when two nodes attempt to access the bus simultaneously. The system will then rely on the inter-character timeouts to expire, readying the receiving nodes for a new message.

For message numbers, the datalink header contains a message number field. This can be a single bit and therefore the message number alternates between MsgNum=0 and MsgNum=1. The message numbers help the protocol recover from lost packets.

For ACK responses, if the message was transmitted, the datalink should wait for a reply from the remote node. A timeout (ACK timeout) should be set. If a correct ACK is received back from the remote node, the transaction is complete and the data link can be released for further transactions. The correct ACK is an ACK response with the MsgNum bit set to the same value as the incoming message. If an ACK is received with a mismatched MsgNum bit, a link failure has occurred and the system should attempt to recover using the procedures specified later in this document.

If a BUSY response is received from the remote node then the transaction should be re-tried after a minimum delay of a time specified by a single message byte. The value in this byte should be multiplied by 10 mS to obtain the retry time. If a NAK response is received from the remote node then the transaction cannot be processed. The transaction should not be retried. The NAK response includes a byte holding a NAK reason code. The NAK reason codes are in Table 7.

TABLE 7

| | |
|---|---|
| 0x00 | No reason available |
| 0x01 | Node in Use. Returned if a node attempts to join the bus with a duplicated node id. |
| 0x01 | Message too long |
| 0x02 | Invalid CRC ((node still responds even though there is a chance that the id is corrupt) |
| 0x03 | Protocol not supported |
| 0x04 | Unauthorized message (Invalid WAN request, authentication failed etc) |

A response can be pending for up to the Datalink ACK Timeout (500 mS). If no response is received in this time, the message can be resent immediately. A transaction should be sent up to 3 times. If no response is received in this time, the remote node should be assumed to have disconnected.

On power up and whenever a device is added to the secondary bus network, a full or partial enumeration should take place. When a device powers up, it can announce its presence with a broadcast control message from a randomly generated node address from 0x01 to 0x20. This message announces the intention to join the bus. If possible, the node address from the last connection should be used; otherwise a new random address is generated. The device should then listen for 50 mS for a denial message from other devices on the bus. These denial messages will only come from a node that has already selected the desired node id. Note that the denial will come in the form of a broadcast message from the node ID being attempted to use. If a denial message is received, a new node id should be selected and the connection attempt retried. Note that if denials are received for all possible nodes, the bus is fully populated and the node cannot connect to the bus until another device is removed. If no denials are received in the timeout period, the node can assume it has obtained the required node id and it should then broadcast the Join Network Confirm control message. This message includes a unique product id together with a unique serial number that allows other nodes to determine the capabilities of the connecting node. All other nodes on receiving the Network Confirm messages should respond with their own Network Confirm messages to the new node to allow a network map to be built up if required.

For a network connection when a requested node is not in use, the connecting node generates a random node ID. The connecting node also sends a broadcast message with a node request. The connecting node can wait for 10 ms. If there are no denials, the node can join the network. Other nodes can respond with a join request to the new node with their own IDs. This is repeated for all other connected nodes.

For a network connection when a requested node is in use, the connecting node generates a random node ID. The connecting node also sends a broadcast message with a node request. The connecting node waits for 10 ms. The original node is in use so the original node denies the request. The connecting node selects new node address and repeats join network broadcast. If no denials from the new node, the connecting node can join the network. Other nodes can respond with a join request to the new node with their own IDs. This is repeated for all other connected nodes.

To disconnect from a network, a message can be defined in the application layer protocol indicating a node is about to be disconnected from the network. Note that this message is not mandatory and nodes can be removed without notification. Any node detecting another node has been disconnected may optionally broadcast that a third party node is no longer available if it has not received a disconnect notification.

For a broadcast message response, nodes may not respond at the datalink layer to any messages sent to the broadcast node (0x00). Messages could be passed up to the higher levels for processing.

FIGS. 4A-4D illustrate transaction sequence diagrams in accordance with an embodiment of this disclosure. The transport 402 and datalink 404 layers are at a transmitting node and remote datalink 406 and remote transport 40 layers at a receiving node. The embodiments of the transaction sequence diagrams illustrated in FIGS. 4A-4D are for illustration only. FIGS. 4A-4D do not limit the scope of this disclosure to any particular implementation of transaction sequence diagrams.

Figure 4A:
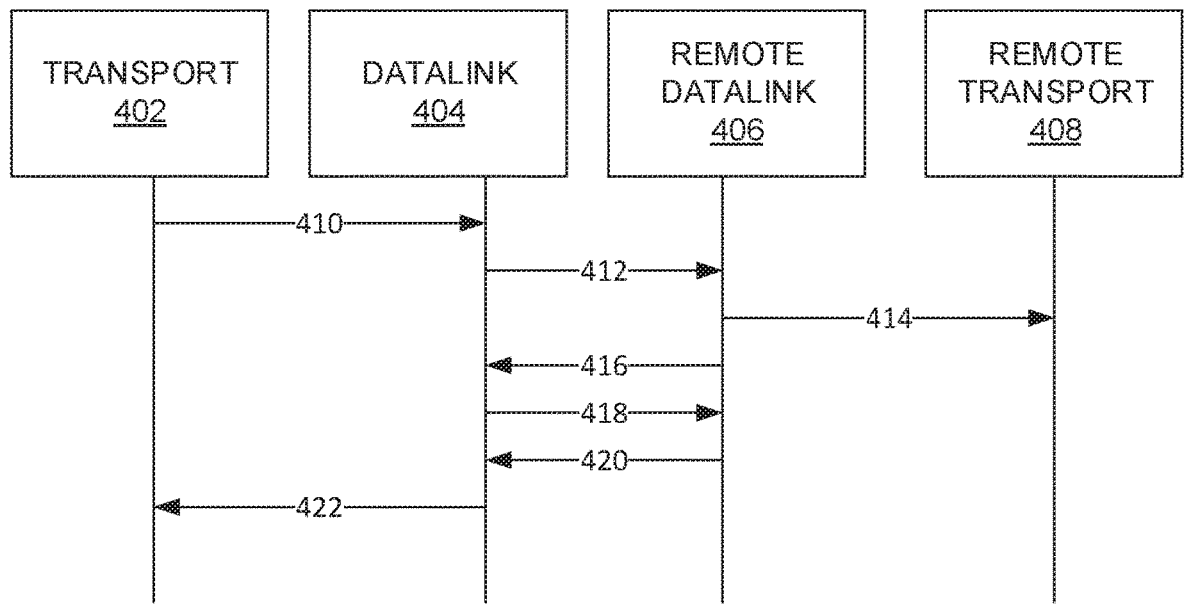
FIGS. 4A-4D illustrate transaction sequence diagrams in accordance with an embodiment of this disclosure.

FIG. 4A illustrates a transaction sequence diagram for a good transaction where the ACK is corrupted. At message 410, the transmitting node issues a command to send a datalink packet to node n. At 412, the transmitting node transport layer sends data bytes to receiving node n with a message number of 0. The remote datalink layer at the receiving node conducts a length and CRC check. If passed, at 414, the remote datalink layer passes the message to the remote transport layer and, at 416, transmits the ACK for message 0 to the originating node.

If no acknowledgement is received because it was lost of corrupted, the transmitting node timeouts and, at 418, resends data bytes to receiving node n with message number of 0. The receiving node can acknowledge, at 420, the message number without a datalink event as the message number is the same as the previous message.

At 422, the datalink indicates acknowledgement of the response.

Figure 4B:
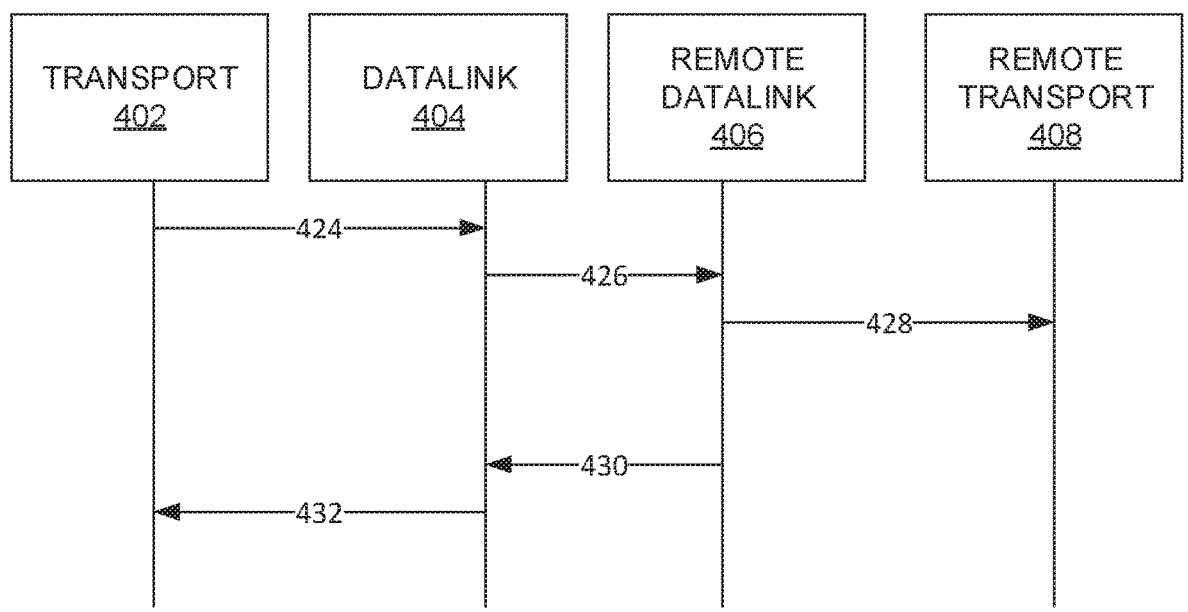

FIG. 4B illustrates a transaction sequence diagram for a good transaction. At message 424, the transmitting node issues a command to send a datalink packet to node n. At 426, the transmitting node sends data bytes to receiving node n with a message number of 0. The remote datalink layer at the receiving node conducts an ID and CRC check. If passed, at 428, the remote datalink layer acknowledges receipt event. At 430, the receiving node acknowledges message number 0. The datalink layer acknowledges, at 432, the response.

Figure 4C:
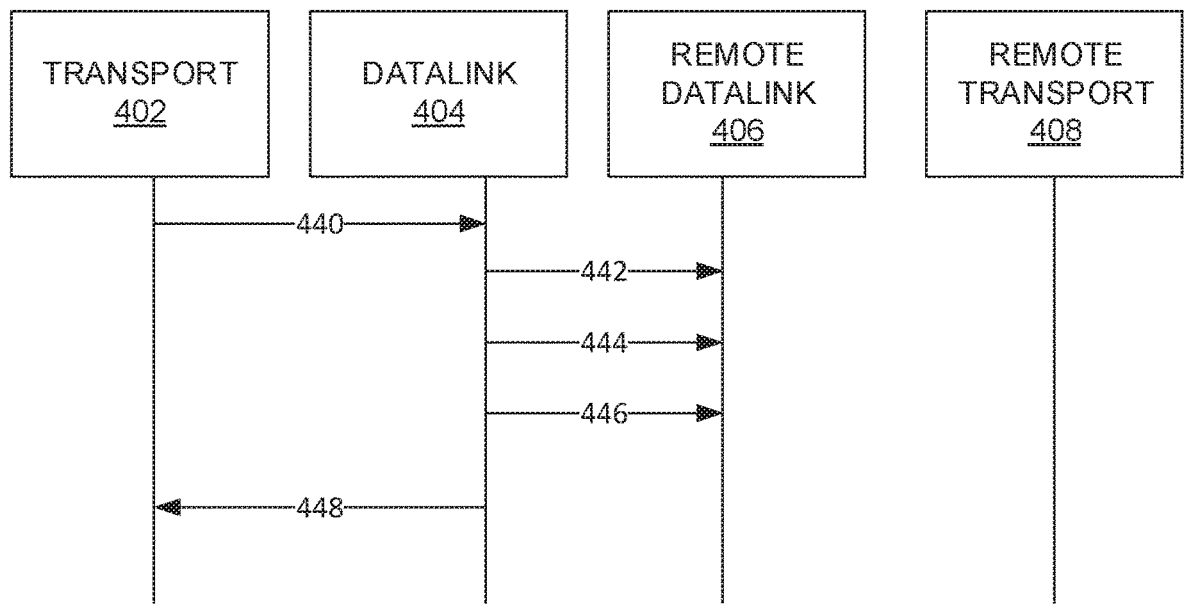

FIG. 4C illustrates a transaction sequence diagram for a node responding. At message 440, the transmitting node issues a command to send a datalink packet to node n. At 442, the transmitting node sends data bytes to receiving node n with a message number of 0. If no acknowledge, at 444 and after a timeout, the transmitting node sends data bytes to receiving node n with a message number of 0. If no acknowledge, at 446 and after a timeout, the transmitting node sends data bytes to receiving node n with a message number of 0. At 448, the datalink layer indicates no link to the transport layer after a timeout.

Figure 4D:
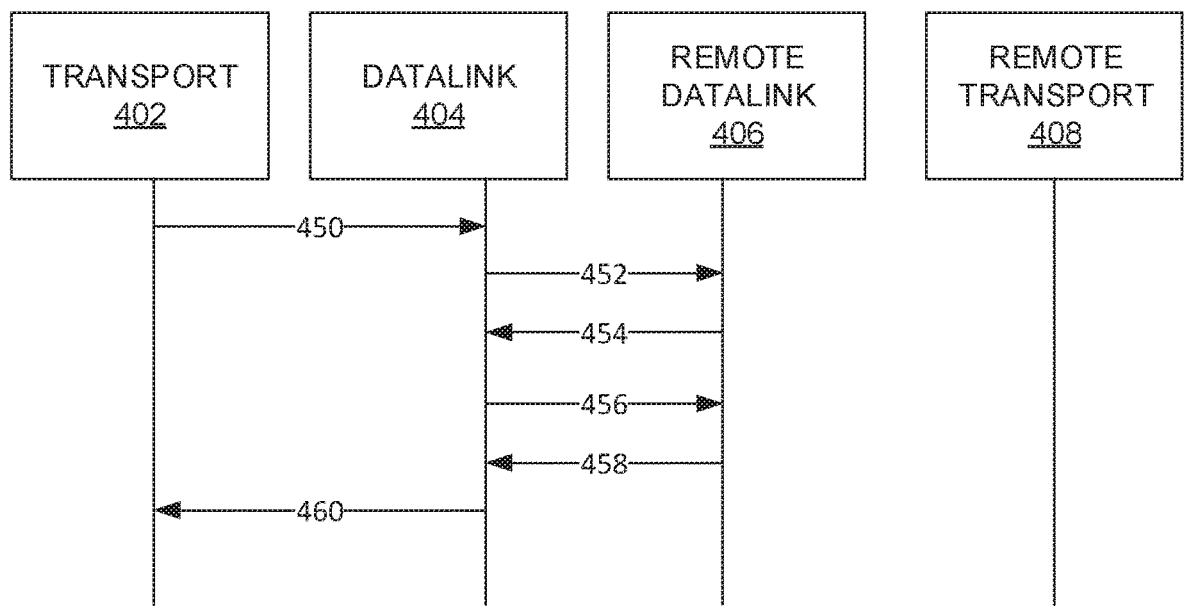

FIG. 4D illustrates a transaction sequence diagram for a corrupted message. At message 450, the transmitting node issues a command to send a datalink packet to node n. At 452, the transmitting node sends data bytes to receiving node n with a message number of 0. The remote datalink can perform a CRC check. If failed, at 454, the receiving node sends a NAK. At 456, the resend due to a timeout or NAK. At 458, the receiving node may acknowledge a uncorrupted message. At 460, the datalink may acknowledge the response.

For crossed messages, implementers should be aware of the possibility of crossed message where an incoming message is received while an outgoing message is pending. One of three strategies should be adopted:

A datalink response should be sent to the incoming message. Once the bus transaction is completed, the pending outgoing message can then be processed.

A busy response is sent to the originating node. The pending message can then be sent. The originating node can resend the original incoming message after a busy timeout.

Transmission requests are blocked during any datalink activity. It is up to the transport or application layers to re-issue the request at a later time.

The data links can have the following basic timing characteristics: Baud rate of 115,200 bauds; character transmission time of 86.8 microseconds; max message length of a 5 byte header plus 255 payload bytes plus two bytes for CRC for 262 total bytes; max message time can be 262 bytes times 86.8 microseconds for 27.2 milliseconds; ACK/NAK time can be 7 bytes times 86.6 microseconds for 608 microseconds.

As nodes can change, each device on the bus will have an id formed from the product type id and the unique serial number. Note that this id will be unique throughout the entire secondary bus network. Protocol 0 will contain a command requesting a node with a particular Device Id to respond. This allows local or remote nodes to rebuild a network map and remote nodes to poll networks for lost or stolen units. It is left up to implementers as to whether the products differentiate and offer different functionality between local and remote nodes. There is no need to name a network until it is connected to an access point. An access point connects a local network to the secondary bus network. Network names must be unique and can be generated, if required, by the access point. Once the LAN is connected to the secondary bus network, any connected device can be individually accessed by using a form such as Device_ID@Network_ID. The Access Point will be responsible for ensuring a secure, authenticated connection to the secondary bus servers. It will also bridge the WAN and the local network by converting Device Id to and from the node id and by buffering, handling any packet size differences. Devices may optionally implement additional security and/or authentication measures before enabling sensitive functionality.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

Figure 5:
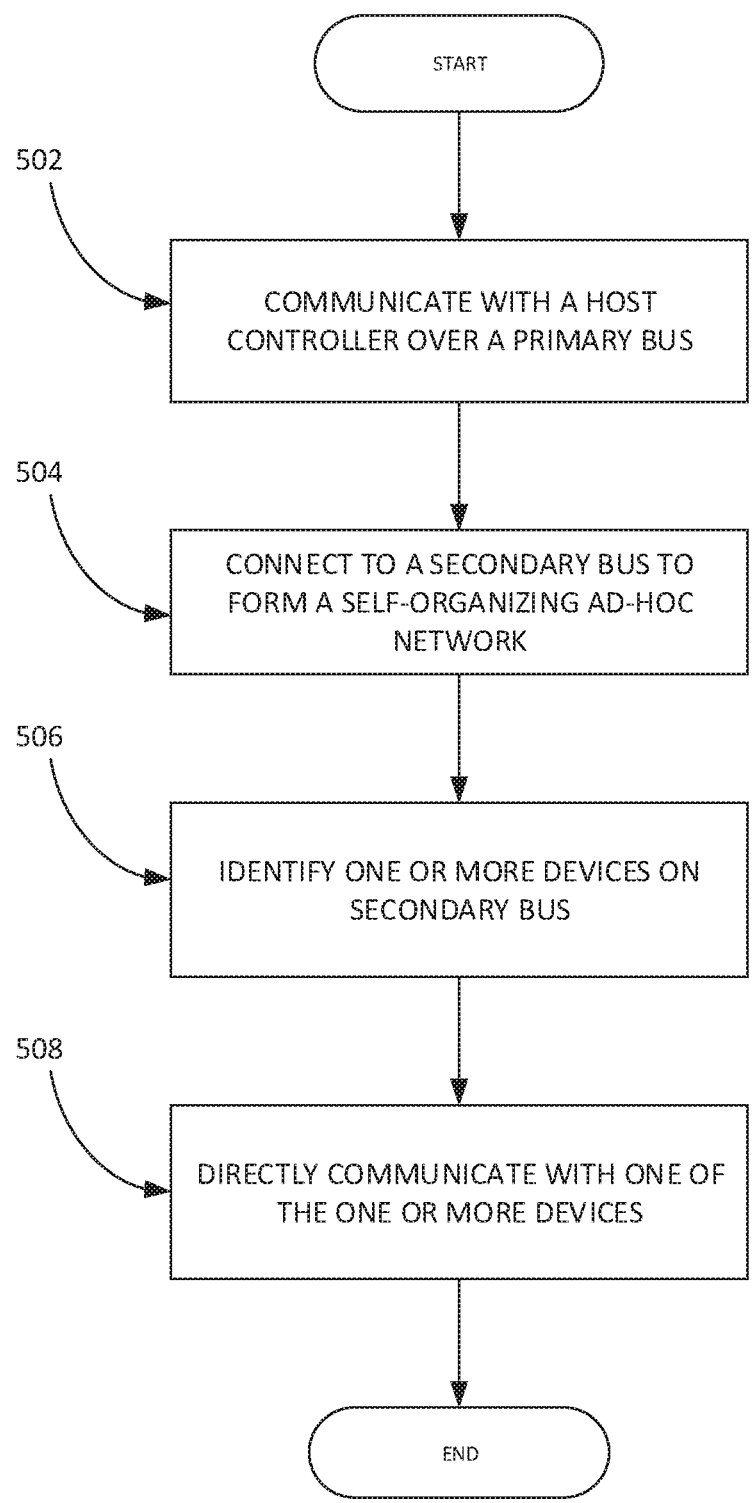
FIG. 5 illustrates an example process for communicating over multiple networks in an automated transaction system according to this disclosure.

FIG. 5 illustrates an example process 500 for communicating over multiple networks in an automated transaction system according to this disclosure. The process can be executed by one or more of the devices shown in FIG. 2. For example, the process 500 can be executed by note validator 218.

At step 502, the device communicates with a host controller over a primary bus in the automated transaction system. At step 504, the device connects to a secondary bus to form a self-organizing ad-hoc network. The connection does not require a technician to configure and may dynamically set when connected. At step 506, the device identifies one or more devices on a secondary bus in the automated transaction system. At step 508, the device directly communicates with one of the one or more devices over the secondary bus.

Figure 6:
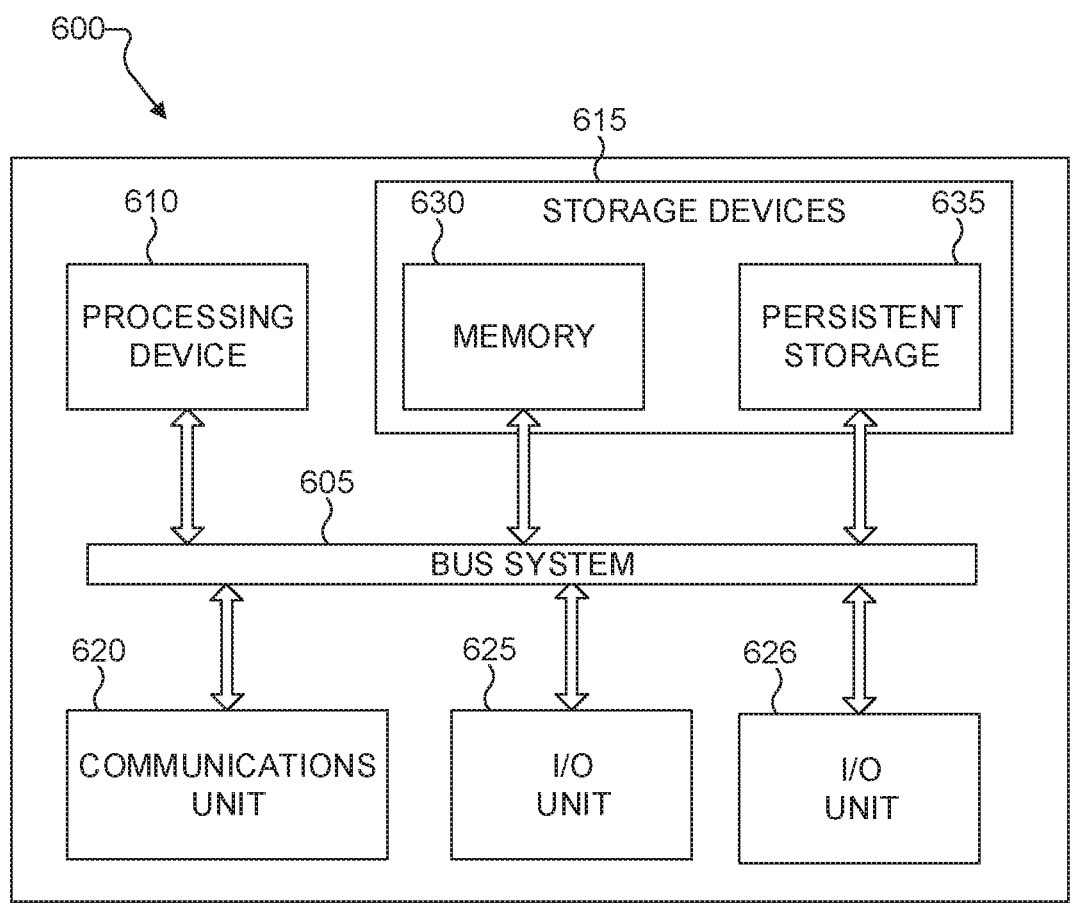
FIG. 6 illustrate example devices in an automated transaction system according to this disclosure.

FIG. 6 illustrate example devices 600 in an automated transaction system according to this disclosure. In one example, FIG. 6 illustrates an example access point 212 of FIG. 2. Different components illustrated in FIG. 6 can also be included in other devices as shown in FIG. 2, such as, for example note validator 218 or coin mechanism 216.

As shown in FIG. 6, the device 600 includes a bus system 605, which supports communication between at least one processing device 610, at least one storage device 615, communications unit 620, and input/output (I/O) units 625-626.

The processing device 610 executes instructions that may be loaded into a memory 630. The processing device 610 may include any suitable number(s) and type(s) of processors or other devices in any suitable arrangement. Example types of processing devices 610 include microprocessors, microcontrollers, digital signal processors, field programmable gate arrays, application specific integrated circuits, and discreet circuitry.

The memory 630 and a persistent storage 635 are examples of storage devices 615, which represent any structure(s) capable of storing and facilitating retrieval of information (such as data, program code, and/or other suitable information on a temporary or permanent basis). The memory 630 may represent a random access memory or any other suitable volatile or non-volatile storage device(s). For example, the memory 630 could be a pattern of fixed resisters on a piece of silicon. The persistent storage 635 may contain one or more components or devices supporting longer-term storage of data, such as a ready only memory, hard drive, Flash memory, or optical disc.

The communications unit 620 supports communications with other systems or devices. For example, the communications unit 620 could include a network interface card or a wireless transceiver facilitating communications over a network. The communications unit 620 may support communications through any suitable physical or wireless communication link(s).

The I/O units 625-626 allows for input and output of data. The I/O units 625-626 can also be referred to as interfaces. The I/O units 625-626 may provide a connection to primary and secondary buses as discussed herein. The I/O units 625-626 can also be sued for user input through a keyboard, mouse, keypad, touchscreen, or other suitable input device. The I/O units 625-626 may also send output to a display, printer, or other suitable output device. There can be additional I/O units in various embodiments.

Although FIG. 6 illustrates one example of a device 600, various changes may be made to FIG. 6. For example, the components of the device 600 could be rearranged or have different patterns. Various components in FIG. 6 could be omitted, combined, or further subdivided and additional components could be added according to particular needs. For example, the device may or may not include a communication unit 620.

As discussed above, device 600 could illustrate an example note validator or coin mechanism. These devices may also include access points as shown in FIG. 2. When a validator or coin mechanism is being used as an access point, the device may provide the ad-hoc network over the secondary bus. These devices may also include the communications unit to communicate external to the ad-hoc network with external devices to the vending machine.

One embodiment provides an apparatus for use in an automated transaction system. The apparatus includes a first interface coupled to a primary bus, the first interface configured to permit communication of data. The apparatus also includes a second interface coupled to a secondary bus, the second interface configured to permit communication of the data. A network topology of the primary bus is different from a network topology of the secondary bus. The apparatus also includes at least one processing device coupled to the first interface or second interface. The at least one processor is configured to communicate the data over at least one of the first interface or second interface.

An example of the embodiment above, the network topology of the primary bus is a master and slave network topology, and the network topology of the secondary bus is one or more of a peer-to-peer (P2P) network topology or a mesh network topology.

An example of one or more of the examples and embodiments above provides that the at least one processing device is configured to communicate with a host controller through the first interface and the primary bus, and communicate with a secondary controller through the second interface and the secondary bus.

An example of one or more of the examples and embodiments above provides that the at least one processing device is further configured to concurrently perform a firmware update process by communicating with the secondary controller via the secondary bus and a transaction process by communicating with the host controller via the primary bus.

An example of one or more of the examples and embodiments above provides that the secondary controller receives power from the host controller.

An example of one or more of the examples and embodiments above provides that the at least one processing device is configured to directly communicate with another device of the automated transaction system through the secondary bus.

An embodiment of this disclosure provides an automated transaction system. The system includes a primary bus including a host controller, a first device coupled to the host controller over the primary bus, a second device coupled to the host controller over the primary bus, and a secondary bus coupled to the first device and second device. The first device is configured to directly communicate with the second device over the secondary bus.

An example of one or more of the examples and embodiments above provides that a network topology of the primary bus is different from a network topology of the secondary bus.

An example of one or more of the examples and embodiments above provides that the first device is a payment device configured to validate payment, the second device is a selection interface including a display screen configured to accept commands, and commands entered through the display screen of the selection interface are directly communicated to the payment device over the secondary bus.

An example of one or more of the examples and embodiments above provides that the network topology of the primary bus is a master and slave network topology, and the network topology of the secondary bus is an ad-hoc network topology.

An example of one or more of the examples and embodiments above provides that the first device is further configured to concurrently download new firmware over a secondary bus and a transaction process by communicating with the host controller.

An embodiment of this disclosure provides an apparatus for use in an automated transaction system. The apparatus includes a memory element configured to store a device list, at least one processing device configured to: identify one or more devices in a network; add the one or more devices to the device list; and provide the device list to the one or more devices of the network to allow the one or more devices to directly communicate over the network.

An example of one or more of the examples and embodiments above provides that a network topology of the network is an ad-hoc network topology.

An example of one or more of the examples and embodiments above provides a transceiver configured to wirelessly communicate with devices outside of the automated transaction system.

An example of one or more of the examples and embodiments above provides that one of the one or more devices is a payment device in the automated transaction system, and wherein the at least one processing device is further configured to: receive transaction data from the payment device through the network; and control the transceiver to wirelessly transmit the payment data to a device outside of the automated transaction system for authorization.

An example of one or more of the examples and embodiments above provides that the apparatus is configured to receive power from a host controller of the automated transaction system.

An embodiment of this disclosure provides a method for communicating over multiple networks in an automated transaction system. The method includes communicating with a host controller over a primary bus in the automated transaction system. The method also includes identifying one or more devices on a secondary bus in the automated transaction system. The method also includes directly communicating with one of the one or more devices over the secondary bus.

An example of one or more of the examples and embodiments above provides connecting to the secondary bus to form a self-organizing ad-hoc network with no requirement for human configuration.

An example of one or more of the examples and embodiments above provides that the secondary bus is to devices external to the automated transaction system via wireless communications.

An example of one or more of the examples and embodiments above provides, by an access point, secure external access to the secondary bus via encryption and or firewall protection between the secondary bus and an external network.

An example of one or more of the examples and embodiments above provides assigning, by an access point, a universally unique address to a device on the secondary bus when connected via a gateway node to an external network.

What is claimed is:

1. A automated transaction system, comprising:
a primary bus including a host controller;
a first device coupled to the host controller over the primary bus;
a second device coupled to the host controller over the primary bus; and
a secondary bus coupled to the first device and second device,
wherein the first device is configured to directly communicate with the second device over the secondary bus,
wherein the first device is a payment device configured to validate payment,
wherein the second device is a selection interface including a display screen configured to accept commands, and
wherein commands entered through the display screen of the selection interface are directly communicated to the payment device over the secondary bus.

2. The automated transaction system of claim 1, wherein a network topology of the primary bus is different from a network topology of the secondary bus.

3. The automated transaction system of claim 2,
wherein the network topology of the primary bus is a master and slave network topology, and
wherein the network topology of the secondary bus is an ad-hoc network topology.

4. The automated transaction system of claim 1, wherein the first device is further configured to concurrently download new firmware over the secondary bus and a transaction process by communicating with the host controller.

5. A method for communicating over multiple buses in an automated transaction system, the method comprising:
communicating with a host controller over a primary bus in the automated transaction system;
identifying one or more devices on a secondary bus in the automated transaction system, wherein the one or more devices comprise a payment device and a selection interface including a display screen;
validating payment with the payment device;
accepting commands entered through the display screen of the selection interface; and
directly communicating with one of the one or more devices over the secondary bus including directly communicating the commands from the selection interface to the payment device over the secondary bus.

6. The method of claim 5, further comprising:
connecting to the secondary bus to form a self-organizing ad-hoc network with no requirement for human configuration.

7. The method of claim 5, wherein devices on the secondary bus are connected to devices external to the automated transaction system via wireless communications.

8. The method of claim 7, further comprising:
assigning, by an access point, a universally unique address to a device on the secondary bus when connected to an external network.

9. The method of claim 7, further comprising:
converting, by an access point, a universally unique identifier of a device on the secondary bus into a universally unique address when connected to an external network.

10. The method of claim 7, further comprising:
identifying, by an access point, a universally unique address of a device on the secondary bus when connected to an external network.

11. The method of claim 10, further comprising:
transmitting, by the access point, the universally unique address of a device on the secondary bus when connected to the external network.

12. The method of claim 7, further comprising:
transmitting, by an access point, a universally unique identifier of a device on the secondary bus when connected to an external network.

13. The method of claim 5, further comprising:
providing, by an access point, secure external access to the secondary bus via encryption and/or firewall protection between the secondary bus and an external network.

* * * * *

UNITED STATES PATENT AND TRADEMARK OFFICE
CERTIFICATE OF CORRECTION

| | | |
|---|---|---|
| PATENT NO. | : 10,733,124 B2 | Page 1 of 1 |
| APPLICATION NO. | : 16/068886 | |
| DATED | : August 4, 2020 | |
| INVENTOR(S) | : William Martin Osborne | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 200 days.

Signed and Sealed this
Thirty-first Day of January, 2023

Katherine Kelly Vidal
*Director of the United States Patent and Trademark Office*